Figure 1:
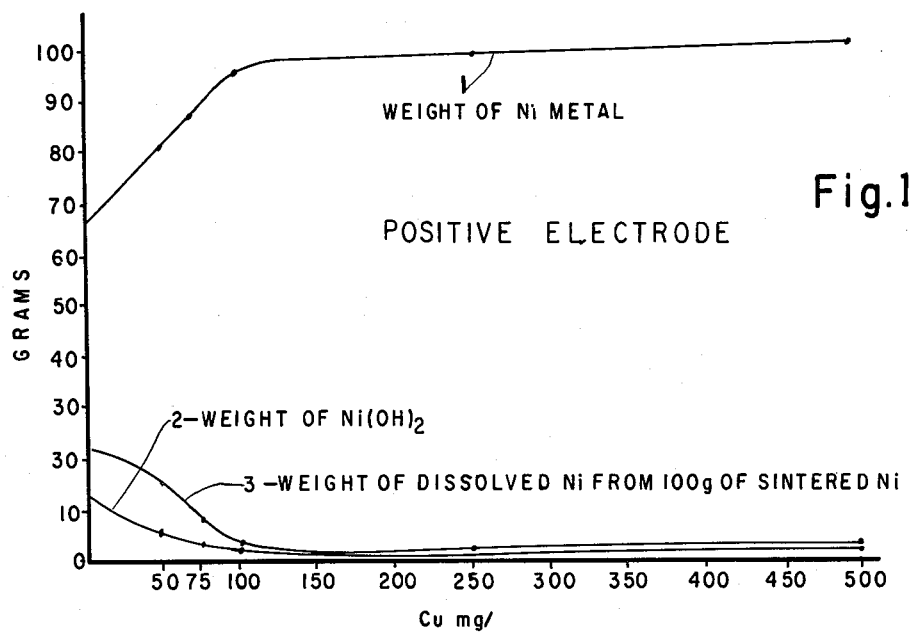

United States Patent Office 3,258,361
Patented June 28, 1966

3,258,361
PROCESS FOR THE IMPREGNATION OF POROUS METAL CARRIERS WITH ACTIVE MATERIAL AND INHIBITOR IN THE MANUFACTURE OF ALKALINE STORAGE BATTERY ELECTRODES AND THE RESULTING PRODUCT
André Léon Kahn, Paris, France, assignor to Societe des Accumulateurs Fixes et de Traction (Societe Anonyme), Romainville, France, a company of France
Filed Jan. 17, 1963, Ser. No. 252,138
Claims priority, application France, Feb. 6, 1962, 887,124/62
19 Claims. (Cl. 136—24)

In a general way, the invention relates to the impregnation of a porous metal carrier with cadmium hydroxide or nickel hydroxide with an eventual addition of cobalt hydroxide and its principal object comprises improving the processes by which said impregnation is effected, viz, by the precipitation of a slightly acid solution of cadmium-nitrate, or nickel and/or cobalt nitrate. Said processes and the improvements according to the invention are more especially, but not exclusively, applied to the manufacture of sintered carrier electrodes for alkaline nickel-cadmium storage cells.

It is well known to manufacture such electrodes by using a porous sintered carrier, usually made of nickel, which is impregnated with active materials in the form of metal hydroxides. The processes used heretofore for such an impregnation are also well known and have been described, e.g. in the French Patents No. 677,780, filed on July 3, 1929 and No. 828,247, filed on October 23, 1937. Said processes are briefly summarized below.

The porous nickel sintered carrier is first impregnated, e.g. with a solution of a salt of the metal yielding the desired active material, said salt being preferably nickel nitrate (for the positive electrodes) or cadmium nitrate (for the negative electrodes) because solutions of these salts may be used in very concentrated states. The corresponding hydroxides may be precipitated in various ways, the more commonly used process consisting in causing the precipitation by the action of an alkaline solution such as a sodium hydroxide solution. It is also possible to use a cathodic polarization which may be brought about in the impregnating solution itself according to the process described in the French Patent No. 828,247 hereinabove mentioned. It is also possible to combine the precipitation and the cathodic polarization in alkaline media.

It should be noted that the nitrate solutions used must be sufficiently acid, otherwise premature precipitation of hydroxide will occur. Thus, nickel hydroxide precipitates in nickel nitrate solutions as soon as their pH reaches a value of about 5 to 6. Preferably, therefore, the pH value should be kept below 5.

In practice, therefore, the impregnating solutions containing about 1 to 3 g./l. of free nitric acid in order to prevent such premature precipitation of hydroxide.

It has been recognized that this free nitric acid does not remain unaltered or inactive during the impregnation. It has been noted, too, that the nickel of the sintered carrier was oxidized either to the dissolved state, or to the nickel hydroxide state and until now it was thought that the oxidizing was caused by the direct attack of the nickel by the said free acid.

The attack of the nickel of the sintered carrier may have detrimental effects and in the first place has the drawback of weakening said carrier. Part of the latter is oxidized as hydroxide or in a soluble form or in both forms. In any case, a mechanical weakening of the carrier is caused by the free acid which may be detrimental to its strength.

If the negative electrode is concerned, such acid attack causes the formation of nickel hydroxide which co-precipitates with cadmium hydroxide. Such partial precipitation of nickel hydroxide is not generally to be desired since it results in various drawbacks such as taking up a certain amount of room, which for the same amount of impregnated cadmium hydroxide, i.e. for the same electrical capacity of the electrode, causes a substantial lowering of the porosity and hence a defective operation of said electrode.

It has already been proposed to oppose the tendency of the nickel of the sintering carriers to dissolve in the cadmium nitrate solution used for the impregnation of negative electrodes, as by the process described in the Fleischer United States Patent No. 2,899,480 of August 11, 1959 which uses additions of ethylene glycol thereto.

It has now been found that the attack of sintered nickel in the carriers by the impregnating solutions, as well as in the case of the manufacture of positive electrodes as in that of the manufacture of negative electrodes is correlative to the reduction of the nitrate ion. Any oxidation of the nickel of the sintered carrier is accompanied by a formation of nitrated products having a lower valency than that of the nitrate ion. Thus, such reduction of the nitrate ion, correlative to the attack of nickel yields first the nitrate ion, then other nitrated products and lastly the ammonium ion as the last term of decay.

The ammonium nitrate thus formed will have in turn a corrosive action on nickel, such action adding to that resulting from the fundamental reducing action of metal nickel in a very divided state on the nitrate ion, which is not to be wondered at since it bears out the well-known fact of the corrosive action of ammonium nitrate.

The first attack can thus be amplified by the same products which it has created.

According to the invention, the attack of the nickel of sintered carriers during the impregnating process is opposed by inhibiting the reduction of the nitrate ion by means of additive inhibitors that provide a slowing down catalytic action or even a negative catalytic action.

Among the catalysts answering these specifications, it was found that copper yields especially favorable results and, in particular, if it is used in the form of cupric nitrate $[Cu(NO_3)_2 \cdot 3H_2O]$.

Other characteristics and features of the invention will appear in the following specification and accompanying drawings which are presented as non-limitative examples describing the method used for causing the phenomenon which is at the root of this invention.

Figure 2:
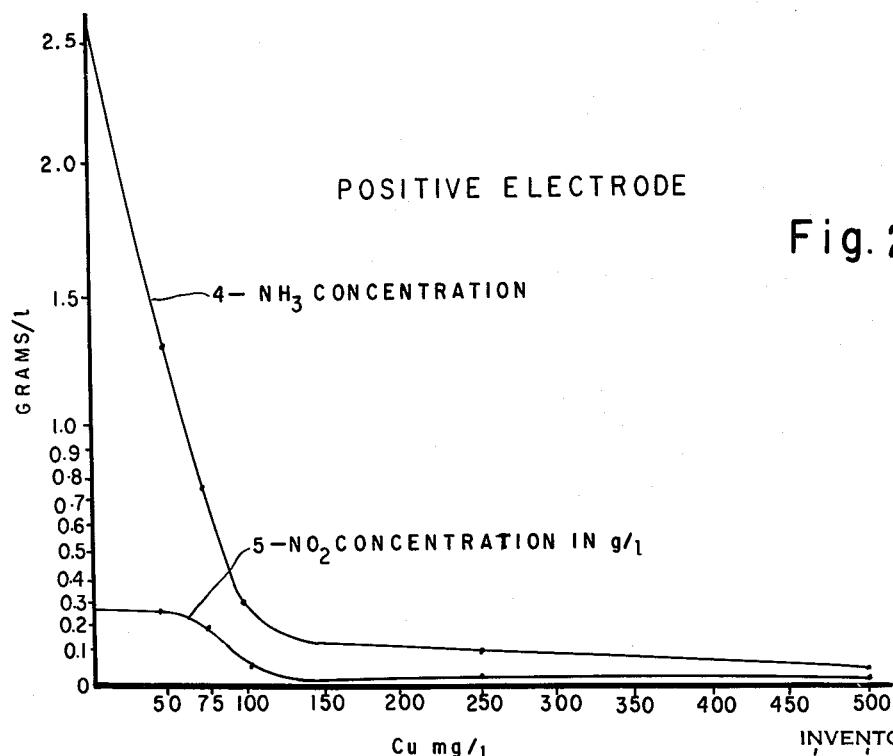
Figure 3:
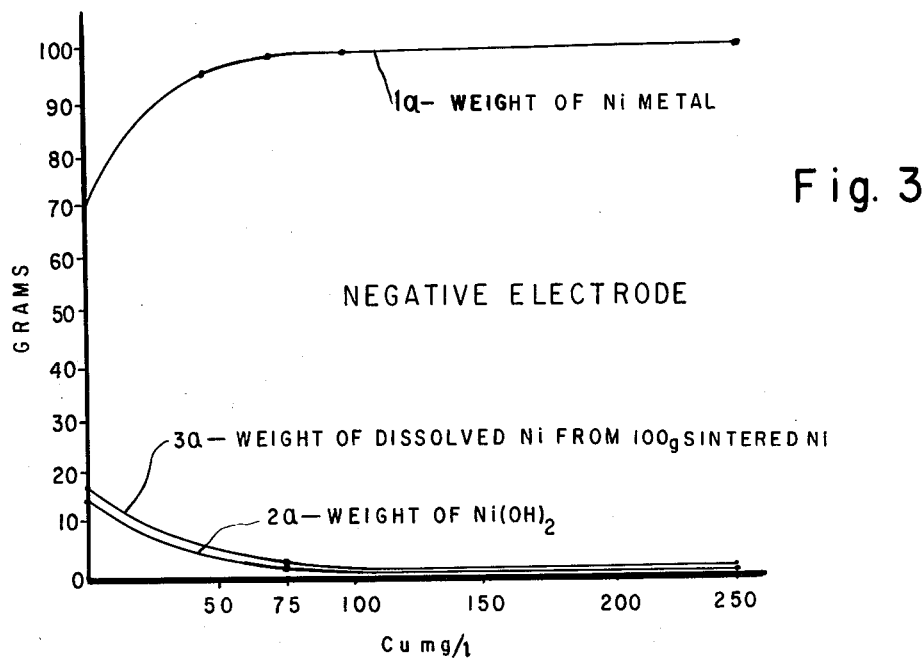
Figure 4:
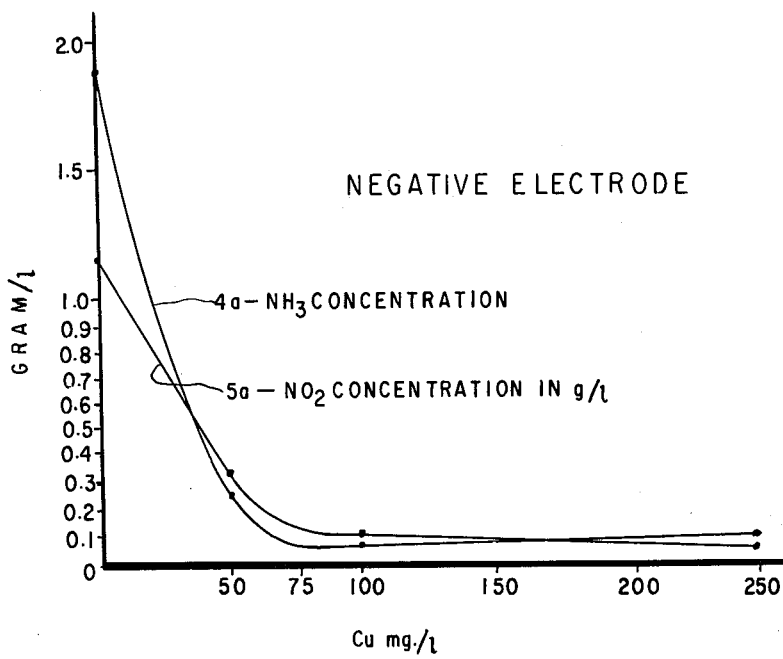

In the drawings,
FIGURES 1 and 2 illustrate test results in practising the invention as applied to impregnation of positive electrodes, and
FIGURES 3 and 4 illustrate similar test results as applied to impregnation of negative electrodes.

In the following examples, a sintered porous nickel carrier was soaked for a given period of time in an acidified impregnating solution of the commonly used type without copper additions and the following results were determined by analyzing the carrier thereafter; its metallic nickel content and its content in nickel oxidized as $Ni(OH)_2$.

From these results, the following have been deduced: its content in oxidized nickel gone in the solution.

The following results have been determined by analyzing the filtered solutions:

The ammonia content of the filtered solution.
The nitrous ion $NO_2^-$ content of the filtered solution.

In a way, the last two results give the degree of reduction of the nitrate ion.

Then the operation was repeated with other sintered porous nickel carriers and various impregnating solutions with additions thereto of cupric nitrate in increasing amounts.

In every test, the attack of the nickel of the sintered carrier either by an acidified nickel nitrate solution or by an acidified cadmium nitrate solution was studied. All experiments were performed in air.

More precisely, suppose that 100 g. of sintered nickel powder are used. After the attack, the washed and dried powder has undergone a change $\Delta p$ in its weight, either as an increase or as a decrease: it then weighs $(100 \pm \Delta p)$ g.

It must be noted that the impregnating process has not been gone through and as a consequence the nickel nitrate eventually present in the solution has not precipitated in the carrier. The change in weight $\Delta p$ therefore only results from the oxidation to the hydroxide state of part of the sintered nickel and from the dissolution of another part of it.

Analysis determines:

Nickel in the metal state, say $n$ percent of the analyzed powder.
Total nickel, say N percent of the analyzed powder.

Of the original 100 g. of sintered nickel powder there remains $$\frac{N}{100}(100 \pm \Delta p) g.$$

of total nickel of which a part is made of $$\frac{n}{100}(100 \pm \Delta p) g.$$

of metallic nickel which remained as metal.

The total weight of oxidated nickel is:

$$100 - \frac{n}{100}(100 \pm \Delta p) g.$$

of which $$\frac{N-n}{100}(100 \pm \Delta p) g.$$

have been transformed into hydroxide and are now in the powder and $$100 - \frac{N}{100}(100 \pm \Delta p) g.$$

have been dissolved.

*Example I.*—The nickel nitrate impregnating solution used contained about 300 g./l. nickel, the acidity of the solution being 3 g./l. NO$_3$H. The impregnating operation was performed at 65° C. for a period of 10 minutes, using 500 ml. of said solution for 100 g. of sintered porous nickel. The following table shows the results.

TABLE 1

| 100 g. Ni become— | Without copper | Cu[1] 50 mg./l. | Cu[1] 75 mg./l. | Cu[1] 100 mg./l. | Cu[1] 250 mg./l. | Cu[1] 500 mg./l. |
|---|---|---|---|---|---|---|
| Metal Ni in g | 65.12 | 79.52 | 87.05 | 94.40 | 98.01 | 97.47 |
| Ni oxidated as Ni(OH)$_2$ in g | 13.16 | 4.86 | 3.80 | 2.58 | 0.27 | 1.14 |
| Dissolved Ni in g | 21.72 | 15.62 | 9.15 | 3.02 | 1.72 | 1.39 |
| NH$_3$ in the filtrate, g./l | 2.647 | 1.286 | 0.784 | 0.282 | 0.195 | 0.062 |
| NO$_2^-$ in the filtrate g./l | 0.263 | 0.297 | 0.231 | 0.059 | 0.009 | 0.007 |

[1] Cu in form of cupric nitrate.

This table very clearly shows that:

(a) There is an inhibiting action of copper in the reduction of the nitrate ion;

(b) The 100 mg./l. cupric nitrate content shows a very substantial action which is of industrial interest;

(c) The attack of nickel cannot be only caused by a mere dissolving action of the free acid. When there is no copper present the attack alters about one third of nickel since an average of about 33 g. is altered. If this were due to a mere dissolution of nickel by acid, it would require:

$$2 \times \frac{33}{59} \times 63 = 71 g.$$

of nitric acid. Only 500 ml. of impregnating solution were used and they contained 1.5 g. of free nitric acid. This acid could only dissolve:

$$33 \times \frac{1.5}{71} = 0.7 g.$$

which is a very small part of the actually altered nickel.

Therefore, the oxidation of nickel in contradistinction with the general opinion, cannot be ascribed to the mere dissolving action of the free acid on nickel.

This oxidation of the divided nickel is certainly of a catalytic kind and it may only be explained by the reduction of the nitrate ion due to the reducing action of metallic nickel. This is corroborated by the experiments.

FIGURES 1 and 2 present a graphic representation of the results shown in the Table I.

In FIGURE 1, the copper contents measured in mg./l. of about 25% whereas the addition of 100 mg./l. copper ordinates. The curves 1, 2 and 3 respectively represent the weights in g. of metal nickel, the weights in g. of nickel in the hydroxide state and the weights in g. of dissolved nickel obtained from 100 g. of sintered nickel.

In FIGURE 2, the copper contents measured in mg./l. of solution, are plotted as abscissae against the concentrations measured in g./l., of ammonia (curve 4) and NO$_2^-$ (curve 5) as ordinates.

*Example II.*—The object of this test was to check the inhibiting action of copper in the form of cupric nitrate when the impregnating solution was nickel nitrate containing cobalt nitrate. Such solutions are frequently used for impregnating positive electrodes.

The impregnating solution used was nickel nitrate containing about 300 g./l. nickel to which was added 25 g./l. of cobalt as cobalt nitrate, and using 500 ml. of said solution of 100 g. of sintered porous nickel, the acidity of the solution being the same as that of Example I.

The impregnation operation was also carried on at 65° C. for a period of 10 minutes. The results are given in the following table:

TABLE II

| 100 g. Ni become— | Without copper | Copper[1] 100 mg./l |
|---|---|---|
| Metal Ni in g | 77.53 | 97.67 |
| Ni oxidated as Ni(OH)$_2$ in g | 20.65 | 0.89 |
| Dissolved Ni in g | 1.82 | 1.44 |
| NH$_3$, per liter | 1.079 | 0.329 |
| NO$_2^-$ g., per liter | 0.182 | 0.102 |

[1] Copper in form of cupric nitrate.

It clearly appears from this table that the presence of cobalt has not prevented the inhibiting action of the copper. The ratio of altered nickel without copper is of about 25% whereas the addition of 100 ml./l. copper as cupric nitrate decreases this ratio to less than 3%. The correlated decrease in the ammonia content which goes from 1.079 to 0.329 g./l. bears out this fact.

*Example III.*—The object of the test was to check the inhibiting effect of copper in the form of cupric nitrate when the impregnation is made by a cadmium nitrate solution, for the negative electrode manufacture.

The cadmium nitrate solution used contained about 380 g./l. cadmium, the acidity of the solution being 1 g./l.

NO₃H. The operation was carried out at 35° C. for a period of 10 minutes using 500 ml. of impregnating solution for 100 g. of sintered porous nickel.

The results are shown in the following table:

Table III

| 100 g. Ni become— | No copper | Copper [1] 50 mg./l | Copper [1] 75 mg./l | Copper [1] 100 mg./l | Copper [1] 250 mg./l |
|---|---|---|---|---|---|
| Metal Ni in g | 68.87 | 95.10 | 97.85 | 98.81 | 98.64 |
| Ni oxidated as Ni (OH)₂ in g | 14.74 | | 0.88 | 0.71 | 0.50 |
| Dissolved Ni in g | 16.39 | | 1.27 | 0.48 | 0.86 |
| NH₃ in the filtrate, g./l | 1.928 | 0.257 | 0.075 | 0.094 | 0.124 |
| NO₂⁻ in the filtrate, g./l | 1.200 | 0.350 | 0.127 | 0.145 | 0.027 |

[1] Copper in the form of cupric nitrate.

It is clearly seen from this table that copper has an inhibiting action on the reduction of the nitrate ion, also in the case of an impregnation by cadmium nitrate.

The results shown on the hereabove table are depicted in graphic form in FIGURES 3 and 4 which are presented in the same way as FIGURES 1 and 2.

Curves 1a, 2a and 3a respectively represent the contents in metal nickel, metal oxidated to the hydroxide state and dissolved nickel; the curves 4a and 5a respectively represent the ammonia content and the NO₂⁻ content.

With the three examples hereinabove, it has been possible to check that copper possesses an inhibiting action on the material of the carrier during the impregnation made by nitrate solutions containing various cations such as nickel, cobalt or cadmium.

It may, therefore, be said that when these cations are present, such cations being the only interesting ones in the manufacture of sintered carrier electrodes intended for use in nickel-cadmium alkaline storage batteries, copper constitutes an inhibitor for the reduction of the nitrate ion by the divided nickel of the sintered carrier.

The tables and graph show that copper plays the part of inhibitor in an especially advantageous way in the case of the impregnation of positive electrodes using a nickel nitrate solution when the concentration of copper is higher than 100 mg./l. up to about 150 mg./l. In the case of the impregnation of negative electrodes using a cadmium nitrate solution, the copper content of the impregnating solution is advantageously higher than 75 mg./l. and preferably about 100 mg./l.

Due to the present invention, the well-known process which has been summarized hereabove, of impregnating the sintered nickel carriers for electrodes of alkaline cadmium nickel storage batteries, is improved by adding copper ions to the solution before effecting the impregnation of the carriers, the concentrations preferably being those mentioned hereabove and copper being advantageously added as cupric nitrate.

In each case after impregnation with the desired nitrate impregnant containing the named inhibiting additive, precipitation of the hydroxides is effected by the action of an alkaline hydroxide precipitant or by cathodic polarization or in any other suitable way.

Although only the impregnation of sintered nickel carrier for the manufacture of electrodes for alkaline nickel-cadmium storage cell has been studied here, it is obvious that using the described process for the impregnation of a porous nickel carrier obtained otherwise than by sintering, or for the impregnation of a porous carrier made of a metal other than nickel would not be beyond the scope of the present invention, even if the product thus obtained were not intended for use as a storage battery electrode. Variations within the scope of the appended claims are possible and are contemplated. There is no intention of limitation to the exact disclosure herein made.

What is claimed is:

1. In a method of manufacturing porous metallic nickel-containing carriers bearing impregnants which are precipitated from other impregnants therein after impregnation thereof with an impregnating solution, the step comprising impregnating the carriers with an acid nitrate impregnating solution of salts selected from the group consisting of cadmium, nickel and cobalt nitrates and containing as an additive in said solution for approximately each 500 ml. of impregnating solution and for approximately each 100 grms. of nickel content of the carriers from 50–500 mg./l. of a copper containing catalytic inhibitor to inhibit reduction of nitrate ions therein by chemical reaction with the metal of the carrier.

2. In a method of manufacturing porous metallic nickel-containing carriers bearing impregnants which are precipitated from other impregnants after impregnation thereof with an impregnating solution, the step comprising impregnating the carriers with an acid nitrate impregnating solution of salts selected from the group consisting of cadmium, nickel and cobalt nitrates and containing as an additive in said solution in approximately each 500 ml. of impregnating solution and for approximately each 100 grms. of nickel content of the carriers from 50 to 500 mg./l. of a catalytic inhibitor to inhibit reduction of nitrate ions therein by chemical reaction with the metal of the carrier, said additive being a copper containing salt.

3. In a method of manufacturing porous metallic nickel-containing carriers bearing impregnants which are precipitated from other impregnants therein after impregnation thereof with an impregnating solution, the step comprising impregnating the carriers for about 10 minutes with an acid nitrate impregnating solution of salts selected from the group consisting of cadmium, nickel and cobalt nitrates and containing as an additive in said solution in approximately each 500 ml. of impregnating solution and for approximately each 100 grms. of nickel content of the carriers from 50 to 500 mg./l. of a catalytic inhibitor to inhibit reduction of nitrate ions therein by chemical reaction with the metal of the carrier, said additive being cupric nitrate.

4. In a method of manufacturing porous metallic nickel-containing carriers bearing impregnants which are precipitated from other impregnants therein after impregnation thereof with an impregnating solution, the step comprising impregnating the carriers with an acid nitrate impregnating solution of salts selected from the group consisting of cadmium, nickel and cobalt nitrates and containing as an additive in said solution for approximately each 500 ml. of impregnating solution and for approximately each 100 grms. of nickel content of the carriers from 50 to 500 mg./l. of a catalytic inhibitor to inhibit reduction of nitrate ions therein by chemical reaction with the metal of the carrier, said additive being a copper containing material in such amount that there is approximately 75–150 mg./l. of copper in said solution.

5. In a method of manufacturing porous metallic nickel-containing carriers bearing impregnants which are precipitated from other impregnants therein after impregnation with an impregnating solution, the step comprising impregnating the carriers for about 10 minutes with an acid nitrate impregnating solution of salts selected from the group consisting of cadmium, nickel and cobalt nitrates and containing as an additive in said solution for approximately each 500 ml. of impregnating solution and for approximately each 100 grms. of nickel content of the carriers from 50 to 500 mg./l. of a catalytic inhibitor to inhibit reduction of nitrate ions therein by chemical reaction with the metal of the carrier, said additive being a cupric ion containing material in the ratio of approximately 75–150 mg./l. of copper in said solution.

6. In a method of manufacturing porous metallic nickel-containing carriers bearing impregnants which are precipitated from other impregnants therein after impregnation thereof with an impregnating solution, the step comprising impregnating the carriers for about 10 minutes with an acid nitrate impregnating solution of salts selected from the group consisting of cadmium, nickel and cobalt nitrates and containing as an additive in said solution for approximately each 500 ml. of of impregnating solution and for approximately each 100 grms. of nickel content of the carriers from 50 to 500 mg./l. of a catalytic inhibitor to inhibit reduction of nitrate ions therein by chemical reaction with the metal of the carrier, said additive being cupric nitrate in the ratio of approximately 75–150 mg./l. of copper in the solution.

7. A method of manufacturing electrodes from sintered porous metallic nickel-containing carriers comprising impregnating the carriers with an acid nitrate ion containing nitrate impregnating solution of salts selected from the group consisting of cadmium, nickel and cobalt nitrate, adding a copper containing catalytic inhibitor to said solution in approximately each 500 ml. of impregnating solution and for approximately each 100 grms. of nickel content of the carriers from 50 to 500 mg./l. of said copper-containing inhibitor to inhibit reduction of nitrate ions thereof by chemical reaction with the metal of the carrier, and thereafter precipitating the hydroxide of the impregnated salts in said carriers.

8. A method of manufacturing positive electrodes from sintered nickel-containing porous carriers comprising impregnating the carriers by an acid nitrate ion containing nitrate impregnating solution of salts selected from the group consisting of nickel and cobalt nitrate, and containing as an additive in said solution in approximately each 500 ml. of impregnating solution and for approximately each 100 grms. of nickel content of the carriers from 50 to 500 mg./l. of a copper ion containing catalytic inhibitor for about 10 minutes to inhibit reduction of said nitrate ions by chemical reaction with the nickel of the carrier, and thereafter precipitating hydroxides of the impregnated salts in said carriers.

9. A method of manufacturing positive electrodes from sintered nickel-containing porous carriers comprising impregnating the carriers by an acid nitrate ion containing nitrate impregnating solution of salts selected from the group consisting of nickel and cobalt nitrate, and containing as an additive in said solution in approximately each 500 ml. of impregnating solution and for approximately each 100 grms. of nickel content of the carriers from 50 to 500 mg./l. of a copper ion containing catalytic inhibitor for about 10 minutes to inhibit reduction of said nitrate ions by chemical reaction with the nickel of the carrier, and thereafter precipitating hydroxides of the impregnated salts in said carriers, said inhibitor being a cupric nitrate containing substance.

10. A method of manufacturing positive electrodes from sintered nickel-containing porous carriers comprising impregnating the carriers by an acid nitrate ion containing nitrate impregnating solution of salts selected from the group consisting of nickel and cobalt nitrate, and containing as an additive in said solution for approximately each 500 ml. of impregnating solution and for approximately each 100 grms. of nickel content of the carriers from 50 to 500 mg./l. of a copper ion containing catalytic inhibitor to inhibit reduction of said nitrate ions by chemical reaction with the nickel of the carrier, and thereafter precipitating hydroxides of the impregnated salts in said carriers, said inhibitor being a copper ion containing substance in the ratio of approximately 100–150 mg./l. of copper in said solution.

11. A method of manufacturing positive electrodes from sintered nickel-containing porous carriers comprising impregnating the carriers by an acid nitrate ion containing nitrate impregnating solution of salts selected from the group consisting of nickel and cobalt nitrate, and containing as an additive in said solution for approximately each 500 ml. of impregnating solution and for approximately each 100 grms. of nickel content of the carriers from 50 to 500 mg./l. of a copper ion containing catalytic inhibitor for about 10 minutes to inhibit reduction of said nitrate ions by chemical reaction with the nickel of the carrier, and thereafter precipitating hydroxides of the impregnated salts in said carriers, said inhibitor being cupric nitrate in the ratio of approximately 100–150 mg./l. of copper in said solution.

12. A method of manufacturing negative electrodes from sintered nickel-containing porous carriers comprising impregnating the carriers by an acid-nitrate ion containing impregnating solution of cadmium nitrate, adding a copper ion containing catalytic inhibitor to said solution in approximately each 500 ml. of impregnating solution and for approximately each 100 grms. of nickel content of the carriers from 50 to 500 mg./l. of said inhibitor to inhibit reduction of said nitrate ions by chemical reaction with the nickel of the carrier, and thereafter precipitating cadmium hydroxide from the impregnated cadmium nitrate in said carriers.

13. A method of manufacturing negative electrodes from sintered nickel-containing porous carriers comprising impregnating the carriers by an acid-nitrate ion containing impregnating solution of cadmium nitrate, adding a copper ion containing catalytic inhibitor to said solution for approximately each 500 ml. of impregnating solution and for approximately each 100 grms. of nickel content of the carriers from 50 to 500 mg./l. of said inhibitor to inhibit reduction of said nitrate ions by chemical reaction with the nickel of the carrier, and thereafter precipitating cadmium hydroxide from the impregnated cadmium nitrate in said carriers, said inhibitor being a copper ion containing substance in the ratio of approximately 75–100 mg./l. of copper in said solution.

14. A method of manufacturing negative electrodes from sintered nickel-containing porous carriers comprising impregnating the carriers by an acid-nitrate ion containing impregnating solution of cadmium nitrate, adding a copper ion containing catalytic inhibitor to said solution for approximately each 500 ml. of impregnating solution and for approximately each 100 grms. of nickel content of the carriers from 50 to 500 mg./l. of said inhibitor to inhibit reduction of said nitrate ions by chemical reaction with the nickel of the carrier, and thereafter precipitating cadmium hydroxide from the impregnated cadmium nitrate in said carriers, said inhibitor being cupric nitrate in the ratio of approximately 75–100 mg./l. of copper in said solution.

15. That improvement in the process of impregnating a porous nickel-containing metal carrier with a metal hydroxide from a slightly acid impregnating solution whose pH value is below 5 of a metallic nitrate containing nitrate ions comprising opposing the attack of the nickel content of the porous metal of the carrier during its impregnation by said solution by inhibiting reduction of the nitrate ions by chemical reaction with the metal of the carrier by use of a copper containing inhibitor additive to the solution providing slowing down or negative catalytic action on said nitrate ions there being in approximately each 500 ml. of said impregnating solution and for approximately each 100 grms. of nickel content of the carrier from 50 to 500 mg. of said copper-containing inhibitor additive.

16. That improvement in the process of impregnating a nickel containing porous nickel-containing metal carrier with a metallic hydroxide by a slightly acid nitrate ion containing salt impregnating solution selected from the group consisting of cadmium, nickel and cobalt nitrates and whose pH value is below 5 comprising adding a copper-containing catalytic inhibitor to said solution to inhibit reduction of the nitrate ions thereof by chemical reaction with the nickel of the carrier, there being in approximately each 500 ml. of said impregnating solution for approximately each 100 grms. of nickel content of the carrier from 50 to 500 mg. of said copper-containing inhibitor, and thereafter precipitating hydroxides of the impregnated salts with an alkaline hydroxide precipitant.

17. That improvement in the process of filling the pores of a porous sintered nickel carrier with a precipitated metallic hydroxide comprising the steps of impregnating the carrier with an acid nitrate ion containing nitrate salt containing impregnating solution of the desired precipitant and also including as an additive a copper ion containing inhibitor having slowing down or negative catalytic properties, there being approximately in each 500 ml. of said impregnating solution and for approximately each 100 grms. of nickel of the carrier from 50 to 500 mg. of said copper ion containing inhibitor, to inhibit reduction of the nitrate ions by chemical reaction with the nickel of the carrier and thereafter precipitating the metallic hydroxides from the solution impregnated into said carrier.

18. That improvement in the process of filling the pores of a sintered nickel carrier with a precipitant hydroxide selected from the group consisting of nickel, cadmium and cobalt, comprising the steps of impregnating the carrier with an acid, nitrate-ion containing salt impregnating solution selected from the group consisting of nickel, cadmium and cobalt nitrates and also including as an additive a cupric ion containing inhibitor having slowing down or negative catalytic properties, there being approximately in each 500 ml. of said impregnating solution and for approximately each 100 grms. of nickel of the carrier from 50 to 500 mg. of said cupric ion containing inhibitor, to inhibit reduction of the nitrate ions by chemical reaction with the nickel of the carrier and thereafter precipitating said hydroxides from the solution impregnated into the carrier.

19. A porous metallic carrier electrode prepared according to the method of claim 4.

References Cited by the Examiner

UNITED STATES PATENTS

| | | | |
|---|---|---|---|
| 2,899,480 | 8/1959 | Fleischer | 136—67 |
| 2,969,413 | 1/1961 | Peters | 136—24 |
| 2,969,414 | 1/1961 | Fleischer | 136—29 |
| 3,066,178 | 11/1962 | Winkler | 136—24 |
| 3,108,910 | 10/1963 | Herold | 136—75 X |
| 3,184,338 | 5/1965 | Mueller | 136—75 |

FOREIGN PATENTS

| | | |
|---|---|---|
| 526,351 | 6/1956 | Canada. |
| 613,025 | 1/1961 | Canada. |

WINSTON A. DOUGLAS, *Primary Examiner.*

MURRAY TILLMAN, *Examiner.*

B. J. OHLENDORF, *Assistant Examiner.*